(12) United States Patent
Hirata

(10) Patent No.: US 10,670,849 B2
(45) Date of Patent: Jun. 2, 2020

(54) OBSERVATION DEVICE

(71) Applicant: OLYMPUS CORPORATION, Tokyo (JP)

(72) Inventor: Tadashi Hirata, Tokyo (JP)

(73) Assignee: OLUMPUS CORPORATION, Tokyo (JP)

( * ) Notice: Subject to any disclaimer, the term of this patent is extended or adjusted under 35 U.S.C. 154(b) by 166 days.

(21) Appl. No.: 16/003,421

(22) Filed: Jun. 8, 2018

(65) Prior Publication Data

US 2018/0292636 A1    Oct. 11, 2018

Related U.S. Application Data

(63) Continuation of application No. PCT/JP2015/084954, filed on Dec. 14, 2015.

(51) Int. Cl.
*G02B 21/10* (2006.01)
*G02B 21/06* (2006.01)
(Continued)

(52) U.S. Cl.
CPC ......... *G02B 21/06* (2013.01); *G02B 21/0032* (2013.01); *G02B 21/18* (2013.01);
(Continued)

(58) Field of Classification Search
CPC .... G02B 21/06; G02B 21/0032; G02B 21/18; G02B 5/005; G02B 26/023; G02B 21/26
(Continued)

(56) References Cited

U.S. PATENT DOCUMENTS

| 5,751,475 A * | 5/1998 | Ishiwata | ................. G02B 21/14 |
| | | | 359/371 |
| 6,992,820 B2 * | 1/2006 | Abe | .................... G02B 21/0088 |
| | | | 359/368 |

(Continued)

FOREIGN PATENT DOCUMENTS

| JP | H02-232614 A | 9/1990 |
| JP | H07-261089 A | 10/1995 |
| JP | 2011-008188 A | 1/2011 |
| WO | 2013/094434 A | 6/2013 |

OTHER PUBLICATIONS

International Search Report dated Mar. 8, 2016 issued in International Application No. PCT/JP2015/084954.

*Primary Examiner* — Bumsuk Won
*Assistant Examiner* — Golam Mahmud
(74) *Attorney, Agent, or Firm* — Scully, Scott, Murphy & Presser, P.C.

(57) ABSTRACT

An observation device where a first light path in an illumination optical system is different from a second light path in an object optical system, the illumination optical system includes a light source that emits the illumination light in a first direction, and an illumination deflector that deflects the illumination light from the first direction to a second direction, a pre-reflected illumination angle between a pedestal surface holding the sample and the first direction is smaller than a post-reflected illumination angle between the pedestal surface and the second direction, the object optical system includes a transmission deflector that deflects the transmission light transmitted through the sample from a third direction to a fourth direction, and a post-reflected transmission angle between the pedestal surface and the fourth direction is smaller than a pre-reflected transmission angle between the pedestal surface and the third direction.

8 Claims, 19 Drawing Sheets

(51) Int. Cl.
  *G01B 9/02*   (2006.01)
  *G01B 11/02*  (2006.01)
  *G02B 21/00*  (2006.01)
  *G02B 21/18*  (2006.01)
  G02B 26/02   (2006.01)
  G02B 5/00    (2006.01)
  G02B 21/26   (2006.01)

(52) U.S. Cl.
  CPC .............. *G02B 5/005* (2013.01); *G02B 21/26* (2013.01); *G02B 26/023* (2013.01)

(58) Field of Classification Search
  USPC ........................................................ 359/385
  See application file for complete search history.

(56) References Cited

U.S. PATENT DOCUMENTS

| | | | | |
|---|---|---|---|---|
| 7,158,234 B2* | 1/2007 | Uchiyama | ............ | A61B 1/0008 356/479 |
| 7,456,378 B2* | 11/2008 | Sasaki | ................ | G02B 21/0032 250/201.3 |
| 7,945,108 B2* | 5/2011 | Kono | ................. | G01N 21/6458 359/391 |
| 8,740,774 B2* | 6/2014 | Takizawa | ........... | A61B 1/00082 128/899 |
| 9,304,068 B2* | 4/2016 | Morimoto | .............. | G01N 1/286 |
| 9,406,118 B2* | 8/2016 | Otsuka | .................. | G06T 7/0012 |
| 9,581,802 B2* | 2/2017 | Yokota | ................... | G01B 11/25 |
| 10,133,050 B2* | 11/2018 | Suzuki | .................... | G02B 21/02 |
| 10,222,599 B2* | 3/2019 | Ouchi | ................ | G02B 21/0032 |
| 2014/0333997 A1 | 11/2014 | Oda | | |

\* cited by examiner

OBSERVATION DEVICE

CROSS-REFERENCE TO RELATED APPLICATION

The present application is a continuation of PCT/JP2015/084954 filed on Dec. 14, 2015, the entire contents of each of which are incorporated herein by reference.

BACKGROUND

Field

The present invention relates to an observation device.

Prior Art

An observation device using a phase difference observation method or a differential interference observation method has been known as a device that observes a subject such as a cell with no mark (for example, JP-A-7-261089)

However, in an observation device of JP-A-7-261089, it is necessary to arrange an imaging optical system and an illumination optical system with a subject interposed therebetween, and there is inconvenience that the device becomes large and becomes complicated.

SUMMARY

The present disclosure is directed to an observation device capable of observing a subject, such as a cell, with no mark without increasing a size of the device.

Accordingly, there is provided an observation device including an illumination optical system that diagonally emits illumination light upwards toward a side above a sample from underneath the sample, and an object optical system that captures transmission light, as the illumination light which is emitted from the illumination optical system, is reflected on the side above the sample, and is transmitted through the sample by being diagonally applied to the sample downwards, at a path different from a path of the illumination optical system below the sample. The illumination optical system includes a light source that emits the illumination light in an approximately horizontal direction, a mask that restricts the illumination light from the light source to a specific emission region, and an illumination light deflection element that deflects the illumination light from the light source upwards. The object optical system includes a transmission light deflection element that deflects the transmission light transmitted toward the side below the sample in an approximately horizontal direction.

Furthermore, after the illumination light emitted from the light source is diagonally emitted upwards toward the side above the sample from underneath the sample, the illumination light is reflected on the side above the sample and is diagonally applied to the sample downwards. The illumination light applied to the sample is transmitted through the sample, and the transmission light is captured by the object optical system at the path different from the path of the illumination optical system disposed below the sample. Since both the illumination optical system and the object optical system are arranged below the sample, it is possible to observe the subject such as a cell with no mark by capturing the transmission light without increasing the size of the device.

In this case, since the illumination light emitted from the light source in the approximately horizontal direction is deflected upwards by the illumination light deflection element in the illumination optical system and the transmission light diagonally transmitted through the sample downwards is deflected by the transmission light deflection element in the approximately horizontal direction and is captured in the object optical system, it is possible to reduce the size of the device by reducing the height dimension of the observation device without arranging the illumination optical system and the object optical system such that these systems are long in the vertical direction.

The illumination optical system may include a collimator optical system that converts the illumination light into approximately parallel light.

With such a configuration, even though the reflection position of the illumination light on the side above the sample is changed in an up and down direction, the change of the incidence angle of the illumination light on the object optical system is prevented, and thus, it is possible to observe the sample with high contrast.

The collimator optical system may convert the illumination light deflected by the illumination light deflection element into approximately parallel light which is diagonally headed upwards.

The illumination light deflection element may diagonally deflect the illumination light converted into the approximately parallel light upwards by the collimator optical system.

The illumination optical system may diagonally emit the illumination light upwards from a portion selected among a plurality of portions of the object optical system in a circumferential direction around an optical axis which extends in a vertical direction such that the illumination light is headed toward the optical axis.

With such a configuration, the positions in the circumferential direction in which the illumination light are emitted are selectively switched, and thus, it is possible to deflect the direction of the shadow formed on the image of the sample. Accordingly, it is possible to select optimum illumination corresponding to the sample, and it is possible to improve the visibility of the sample.

Illumination light from the plurality of portions may be converted into approximately parallel light by a common collimator optical system coaxial with the optical axis of the object optical system.

With such a configuration, the number of components is reduced, and thus, it is possible to simplify the structure. The illumination light is incident on the outside of the axis of the common collimator optical system from below in the vertical direction, and thus, it is possible to easily form the illumination light which diagonally tilts upwards such that the illumination light approaches the optical axis in all the portions in the circumferential direction.

The collimator optical system may include a cutout portion that accommodates the object optical system.

With such a configuration, the object optical system is accommodated within the cutout portion, and thus, the space is saved. As a result, it is possible to further reduce the size of the device.

Illumination light from the plurality of portions may be converted into approximately parallel light by each of collimator optical systems.

With such a configuration, since the large common collimator optical system is not used, it is possible to reduce the size of the device.

According to such embodiments, it is possible to observe a subject such as a cell with no mark without increasing a size of a device.

DESCRIPTION OF EMBODIMENTS

Hereinafter, an observation device 1 according to an embodiment will be described with reference to the drawings.

Figure 1:
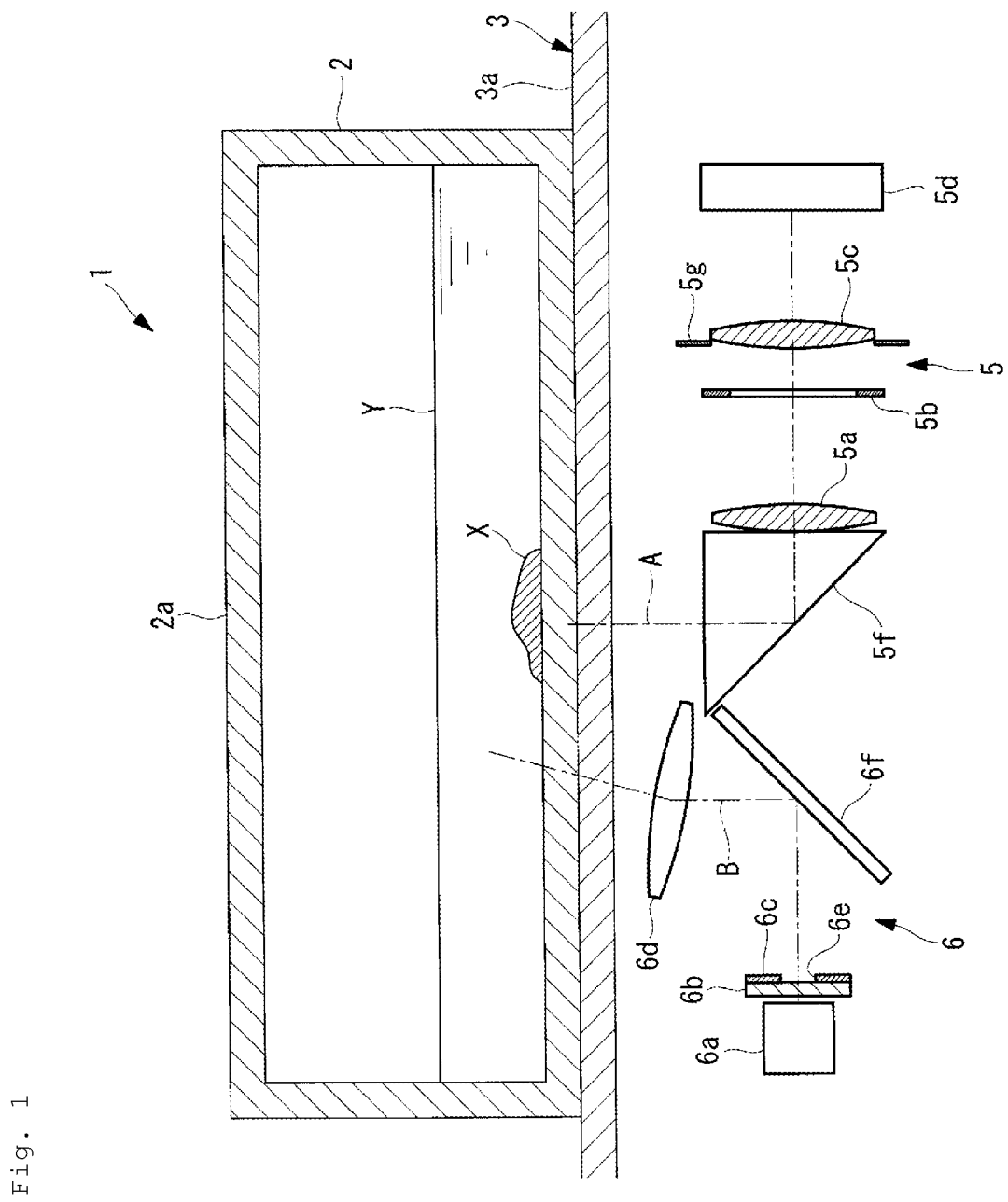
FIG. 1 is a longitudinal sectional view showing an observation device according to an embodiment.
Figure 2:
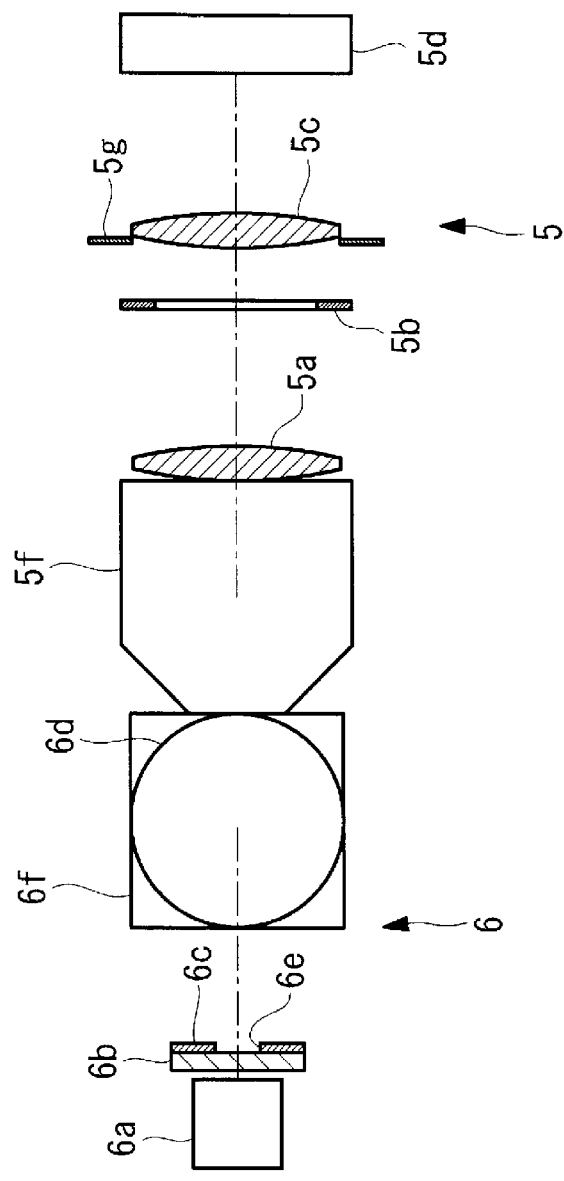
FIG. 2 is a plan view of an illumination optical system and an object optical system of the observation device of FIG. 1.

As stated above, as shown in FIGS. 1 and 2, the observation device 1 according to the present embodiment includes a stage 3 that has a container 2 which contains a sample X such as a cell mounted thereon, an object optical system 5 that is disposed below the stage 3, includes an object lens 5a that concentrates light which is transmitted through the stage 3 from above, and captures light which is transmitted through the sample X, and an illumination optical system 6 that emits illumination light upwards so as to cause the illumination light to be transmitted through the stage 3 at a path different from the object optical system 5.

The stage 3 includes a pedestal 3a made of an optically transparent material, for example, glass so as to cover a region above the object optical system 5 and the illumination optical system 6, and the container 2 is mounted on a top surface of the pedestal 3a.

For example, the container 2 is a cell culture flask including a top plate 2a, and is made of an optically transparent resin as a whole.

As shown in FIG. 1, the illumination optical system 6 includes an LED light source (light source) 6a that emits light in an approximately horizontal direction, a diffusion plate 6b that diffuses light from the LED light source 6a, an illumination mask (mask) 6c that is provided on the diffusion plate 6b and restricts light from the LED light source 6a to a specific emission region, a mirror (illumination light deflection element) 6f that deflects illumination light upwards which is emitted from the restricted emission region and is gradually diffused, and a collimator lens (collimator optical system) 6d that renders the illumination light deflected upwards to approximately parallel light.

Figure 3:
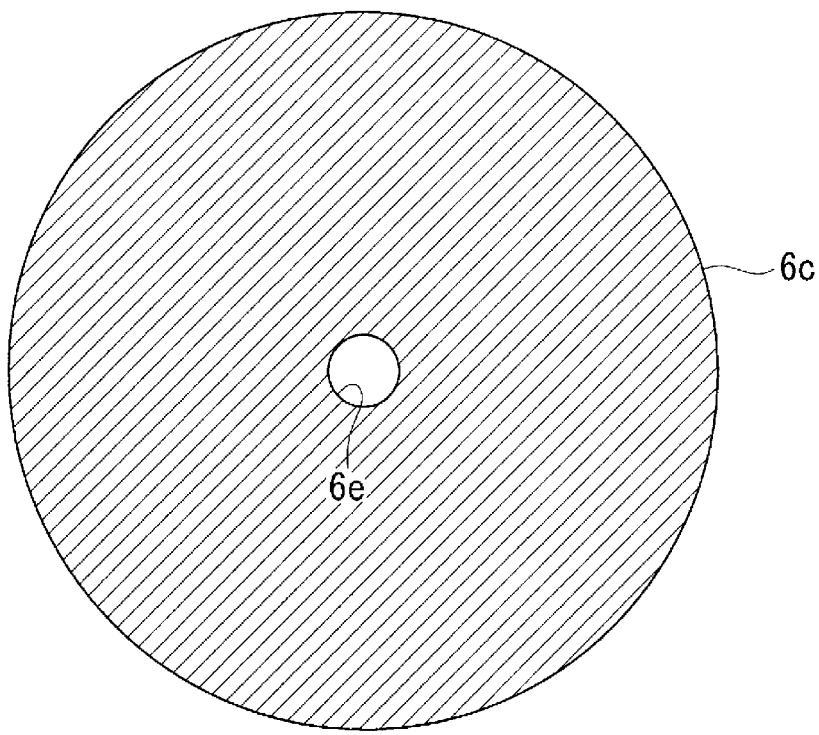
FIG. 3 is a front view showing an example of an illumination mask provided in the observation device of FIG. 1.

The illumination mask 6c has a circular opening (emission region) 6e through which the illumination light is transmitted in a light-shielding member, as shown in FIG. 3.

The mirror 6f is disposed so as to tilt at an angle smaller than 45° with respect to the horizontal direction, and deflects the illumination light incident in the approximately horizontal direction such that the illumination light diagonally tilts upwards with respect to the vertical direction.

The object optical system 5 includes a prism (transmission light deflection element) 5f that deflects the transmission light incident from above in the approximately horizontal direction, an object lens 5a that concentrates the deflected transmission light, a brightness stop 5b disposed near the pupil surface, a flare stop 5g, an imaging lens 5c, and an imaging element 5d. The prism 5f has a deflection surface which tilts at an angle smaller than 45° with respect to the horizontal direction, and deflects the transmission light diagonally incident downwards in the approximately horizontal direction.

Figure 4:
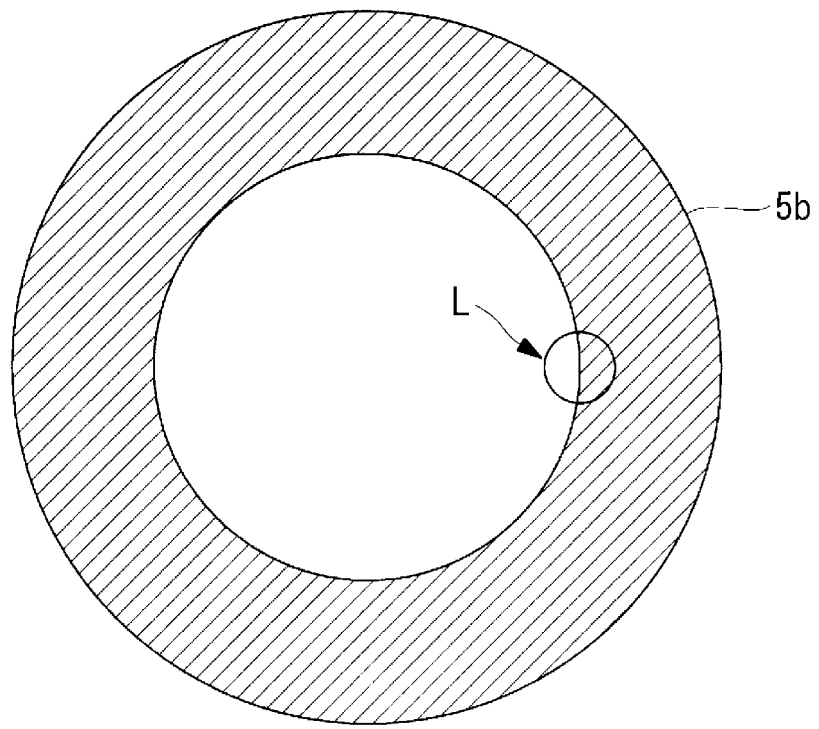
FIG. 4 is a front view showing an example of a positional relationship between a luminous flux and a brightness stop provided in the observation device of FIG. 1.
Figure 5:
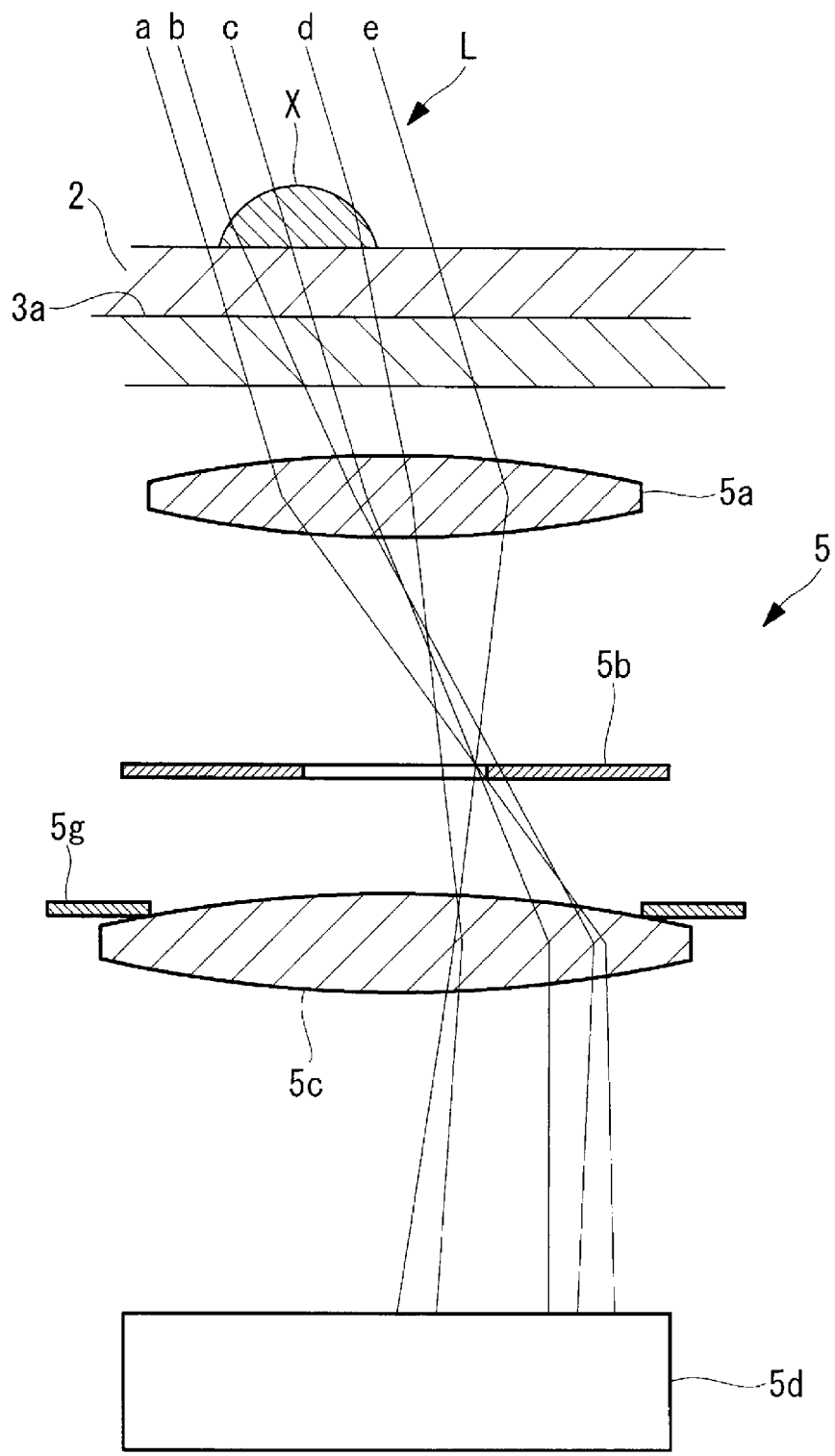
FIG. 5 is a longitudinal sectional view showing the object optical system for describing an operation of the observation device of FIG. 1.

As shown in FIGS. 4 and 5, the illumination optical system 6 and the object optical system 5 is disposed such that a center of a luminous flux L when the light is incident on the pupil surface of the object optical system 5 matches a position of an edge of the brightness stop 5b in a state in which the container 2 which does not accommodate the sample X is disposed on the stage 3.

Hereinafter, an operation of the observation device 1 according to the present embodiment having such a configuration will be described.

The illumination light emitted from the LED light source 6a of the illumination optical system 6 is transmitted through the illumination mask 6c, and thus, the illumination light is emitted as the luminous flux restricted to the emission region 6e having a predetermined size toward the approximately horizontal direction. After the illumination light is diagonally deflected upwards by the mirror 6f, the illumination light is transmitted through the collimator lens 6d and is converted into approximately parallel light. The illumination light becomes the luminous flux L which tilts toward the optical axis A of the object optical system 5 disposed in the vertical direction.

The approximately parallel light diagonally headed upwards from the collimator lens 6d becomes oblique illumination which is transmitted through a liquid Y, a bottom surface of the container 2, and the pedestal 3a constituting the stage 3, is reflected from the top plate 2a of the container 2, and is diagonally applied on the sample X diagonally positioned on the lower side from above. After the transmission light transmitted through the sample X is transmitted through the bottom surface of the container 2 and the pedestal 3a, the transmission light is incident on the object optical system 5.

The transmission light diagonally incident on the object optical system 5 from above is deflected by the prism 5f in the approximately horizontal direction, and is concentrated by the object lens 5a. Thereafter, the transmission light is transmitted through the brightness stop 5b and the flare stop 5g, and is formed as an image by the imaging lens 5c. As a result, the image is captured by the imaging element 5d.

That is, as the illumination light which includes the approximately parallel light diagonally transmitted through the sample X from above, the transmission light transmitted through the sample X is concentrated by the object lens 5a. Since the transmission light transmitted through a region in which the sample X is not present is incident as the approximately parallel light on the object lens 5a without being refracted, after an image of the opening 6e of the illumination mask 6c is projected on the pupil surface of the object lens 5a, a portion transmitted through the brightness stop 5b and the flare stop 5g is formed as an image by the imaging lens 5c, and the formed image is captured by the imaging element 5d.

The transmission light transmitted through a region in which the sample X is present is refracted due to a difference between a refractive index of the sample X and a refractive index of a surrounding region.

In FIG. 5, since light rays a and e which are not transmitted through the sample X and a light ray c incident so as to be perpendicular to a front surface of the sample X are not refracted, the light rays are transmitted without being applied to the edge of the brightness stop 5b, and a bright image is formed.

Meanwhile, in FIG. 5, the light ray b transmitted through a left end of the sample X is refracted, and is blocked by the edge of the brightness stop 5b. As a result, the light ray b transmitted through a left side of the sample X is formed as a dark image.

In FIG. 5, since the light ray d transmitted through a right end of the sample X is refracted and is transmitted through a region closer to the center of the brightness stop 5b, a bright image is formed.

Figure 6:
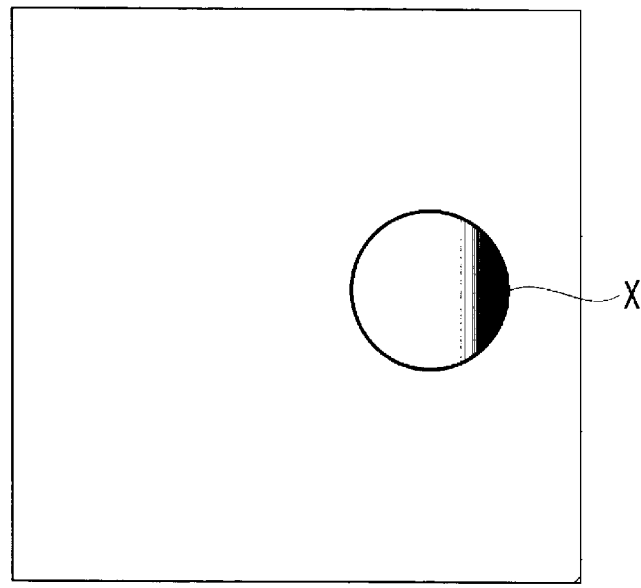
FIG. 6 is a diagram showing an example of an image of a sample acquired by the observation device of FIG. 1.

As a result, it is possible to acquire a high-contrast image in which the sample X is shaded, as shown in FIG. 6. That is, since the sample X is seen in three dimensions due to shadows, the easiness of observation is improved.

In this case, according to the present embodiment, since the mirror 6f or the prism 5f that bends the optical path is provided in the illumination optical system 6 and the object optical system 5, it is possible to arrange most parts of the illumination optical system 6 and the object optical system 5 in a direction extending in the horizontal direction, and there is an advantage that it is possible to maintain a height dimension of the observation device 1.

Figure 7:
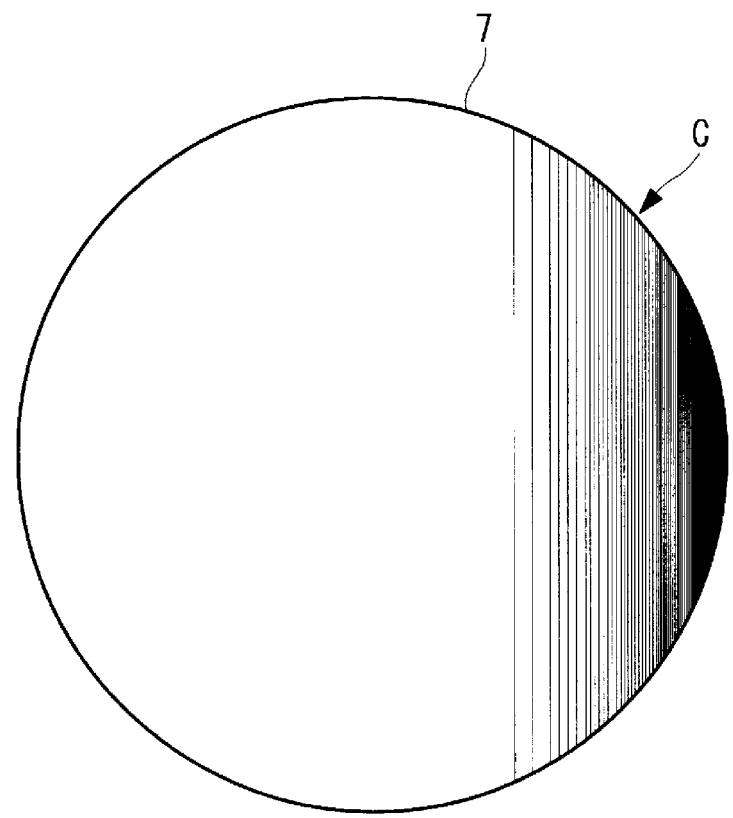
FIG. 7 is a front view showing an example of a pupil modulation element which is a modification example of the observation device of FIG. 1.

Although it has been described in the present embodiment that the brightness stop 5b is disposed on the pupil surface of the object optical system 5 and the illumination optical system 6 and the object optical system 5 are set such that the incident luminous flux is partially blocked by the edge of the brightness stop 5b, the pupil modulation element 7 may be disposed near the pupil surface. For example, as shown in FIG. 7, a pupil modulation element having a low transmittance region C of which transmittance is continuously or intermittently changed in one direction facing an outside in a radial direction of the pupil may be used as the pupil modulation element 7.

With such a configuration, even though the luminous flux from the sample X is incident on the position closer to the center than the edge of the brightness stop 5b, it is possible to observe a high-contrast image in which the sample X is shaded. As a result, the light ray height of the transmission light transmitted through the inside of the object optical system 5 is decreased, and thus, the blocking of the transmission light due to the flare stop 5g is prevented. Accordingly, there is an advantage that it is possible to perform the observation using an image in which brightness unevenness is less as a whole.

Figure 8:
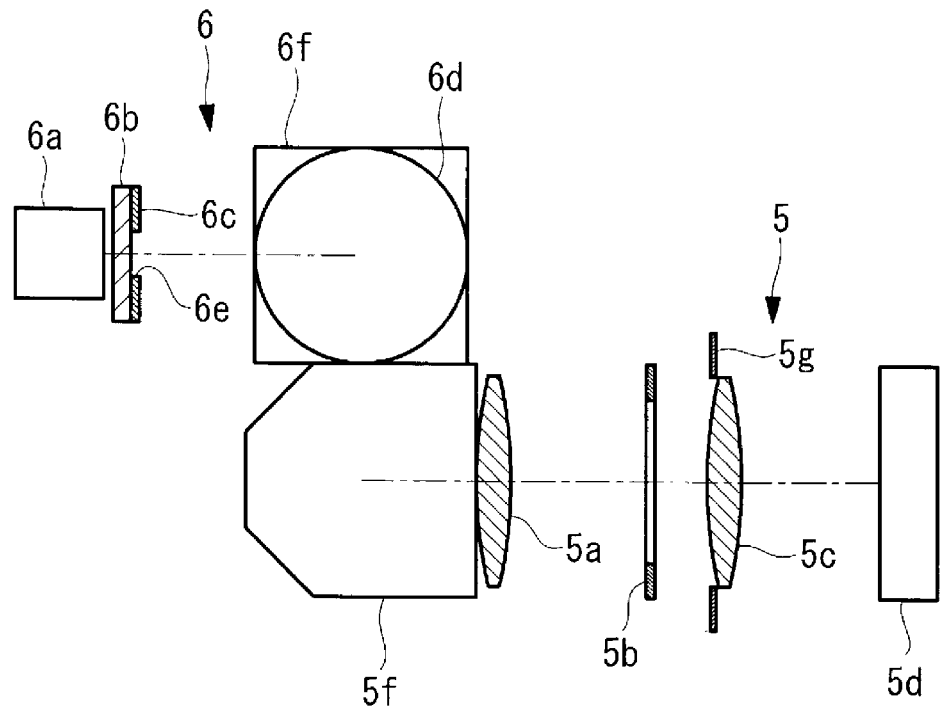
FIG. 8 is a plan view of an illumination optical system and an object optical system showing a modification example of the observation device of FIG. 1.
Figure 9:
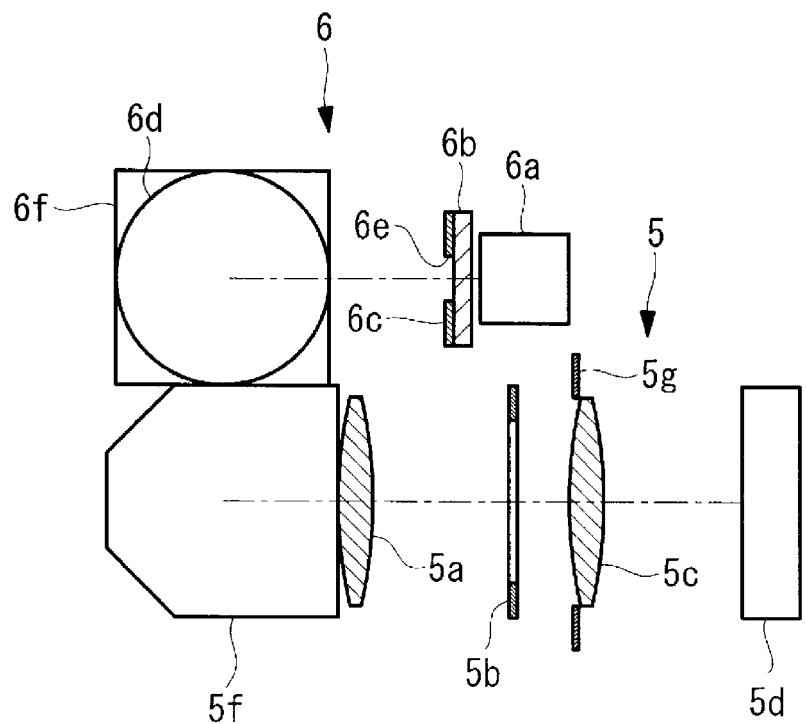
FIG. 9 is a plan view showing an illumination optical system and an object optical system of another modification example of the observation device of FIG. 1.

In the present embodiment, the illumination optical system 6 may be disposed in a position different from that of FIG. 2, as shown in FIG. 8. As shown in FIG. 9, the approximately horizontal portion of the illumination light from the LED light source 6a is positioned in a direction in parallel with the optical axis A of the object optical system 5, and thus, there is an advantage that it is possible to further reduce the size of the device by reducing the entire length.

Figure 10:
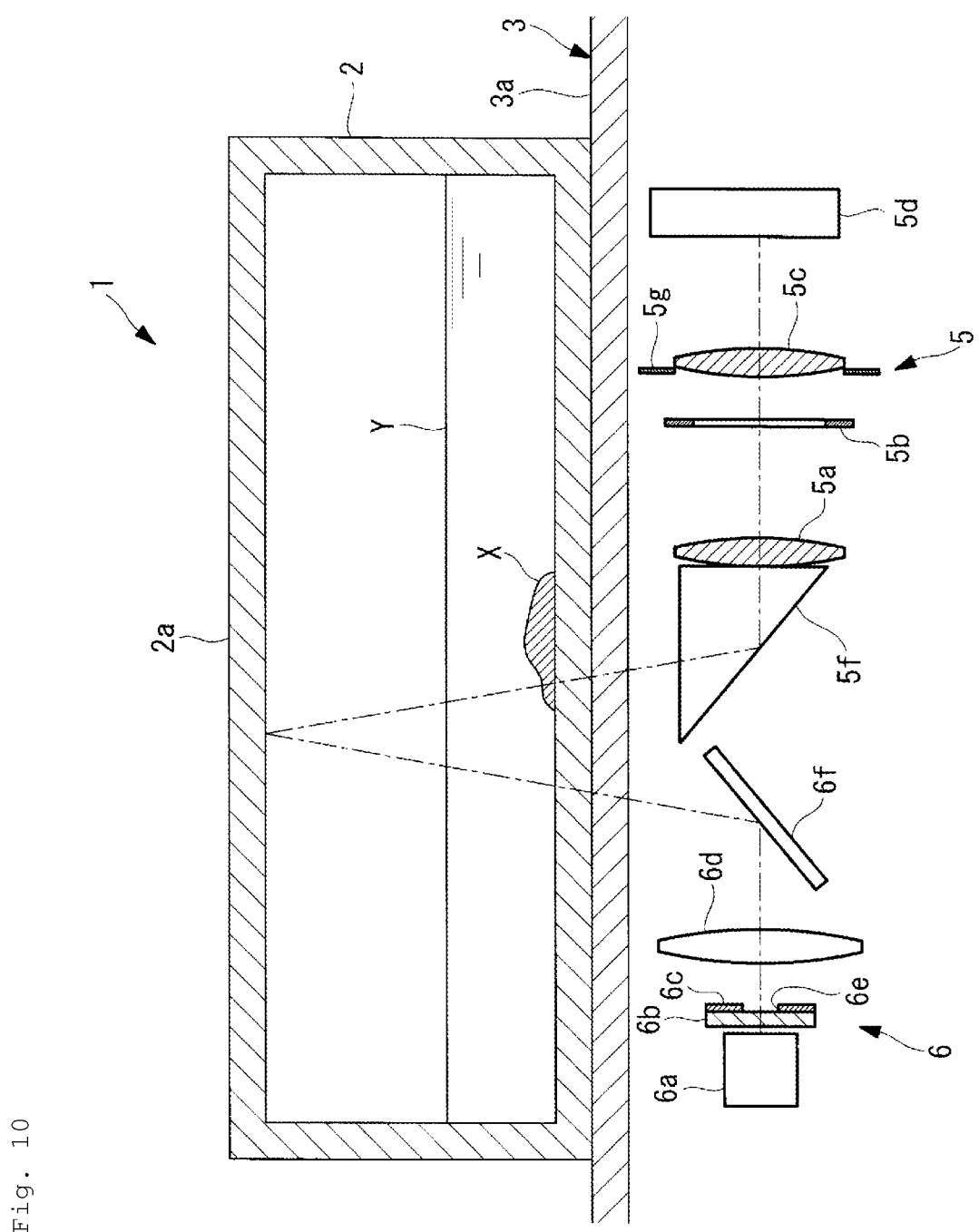
FIG. 10 is a longitudinal sectional view showing another modification example of the observation device of FIG. 1.

Although it has been described in the present embodiment that the illumination light including the approximately parallel light is generated by the collimator lens 6d after the illumination light is deflected by the mirror 6f, the light from the LED light source 6a may be converted into the approximately parallel light by the collimator lens 6d, and the converted parallel light may be diagonally deflected upwards by the mirror 6f, as shown in FIG. 10. Compared to a case where the mirror 6f or the deflection element such as the prism and the collimator lens 6d are arranged in the vertical direction, since it is necessary to secure the space of only the deflection element in the vertical direction, there is an advantage that it is possible to further reduce the size of the device in the up and down direction.

Figure 11:
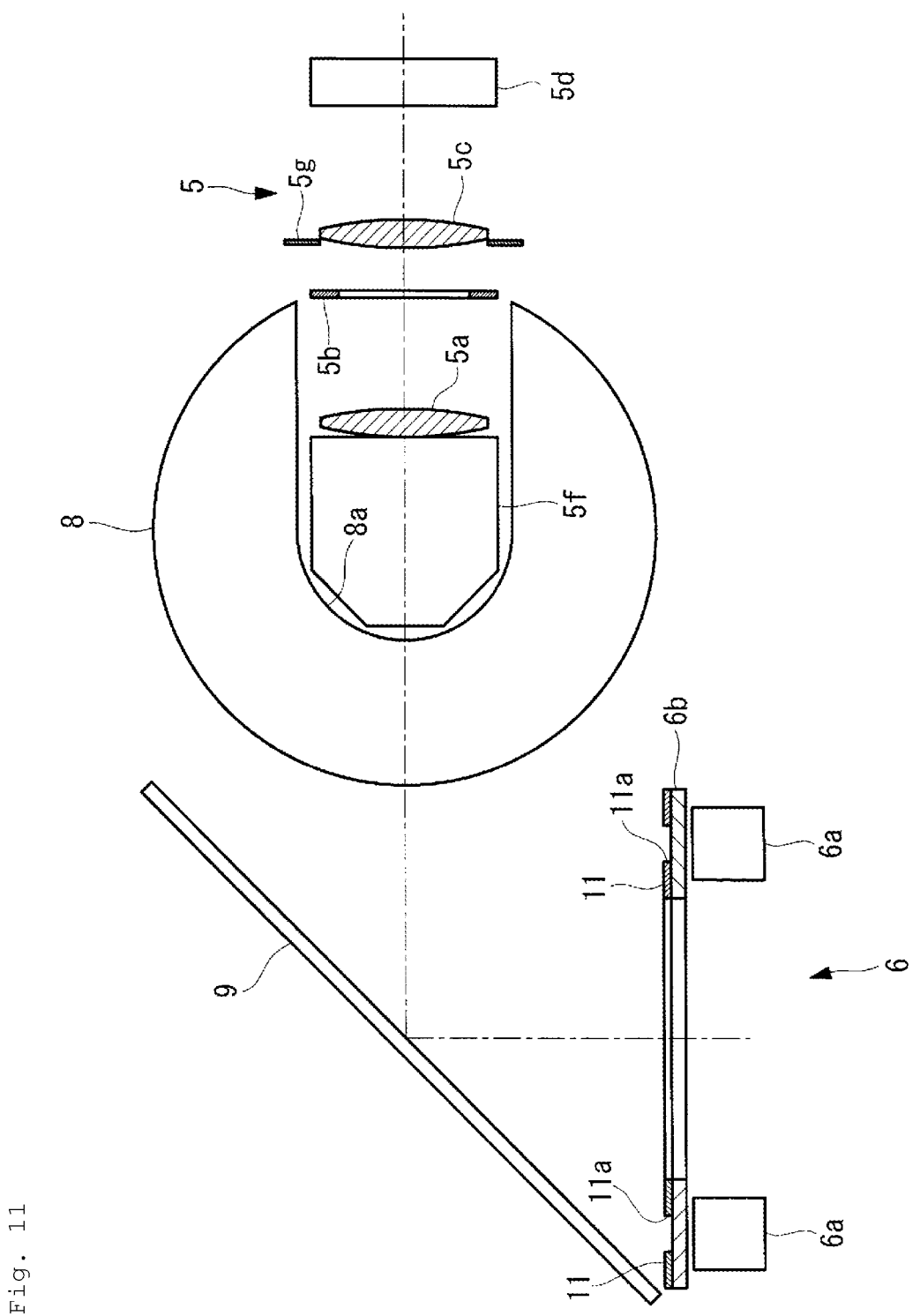
FIG. 11 is a plan view showing an illumination optical system and an object optical system of another modification example of the observation device of FIG. 1.

The collimator lens 6d may not be provided for each LED light source 6a, and a common collimator lens 8 may be used as shown in FIG. 11.

A cutout portion 8a is formed in the collimator lens 8 in one direction of the radial direction from the center, and the object optical system 5 is disposed within the cutout portion 8a. The collimator lens 8 and the object optical system 5 are concentrically arranged while sharing a common optical axis A. The collimator lens renders light incident from the mirror 6f along an optical axis B parallel to the optical axis A of the object optical system 5 to approximately parallel light, and emits a parallel luminous flux while diagonally tilting the luminous flux upwards so as to face the optical axis A. With such a configuration, it is possible to reduce the number of components.

Figure 12:
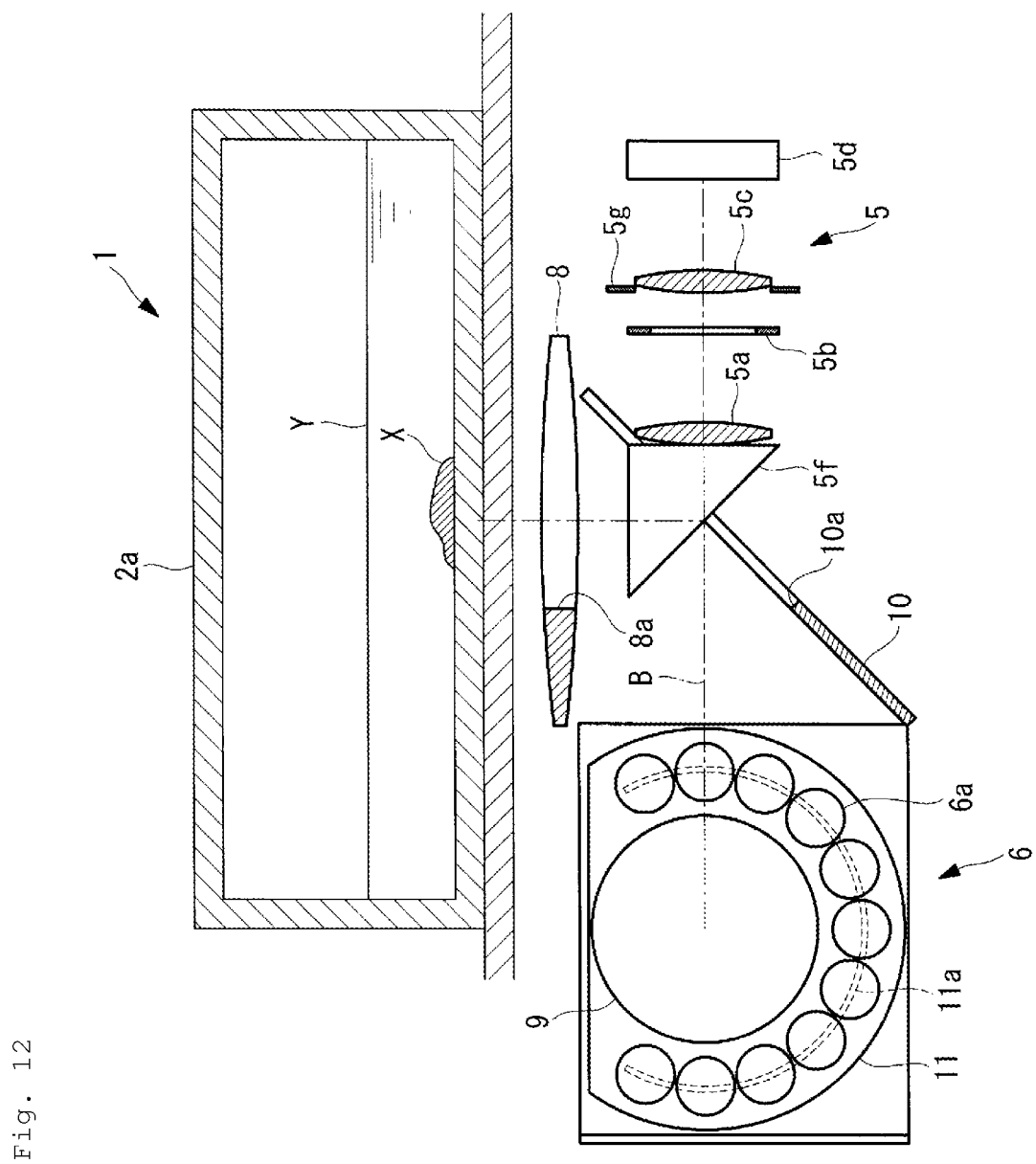
FIG. 12 is a longitudinal sectional view showing the observation device of FIG. 11.

In this case, as shown in FIG. 12, the illumination optical system 6 deflects the illumination light from the plurality of LED light sources 6a, which is arranged in a semicircular arc shape within a vertical plane and emits light rays in the horizontal direction, in the horizontal direction by 90° by the mirror (illumination light deflection element) 9 disposed along the vertical direction at an angle of 45° with respect to the optical axis B of the illumination light, and further deflects the illumination light in the vertical direction by 90° by the arc-shaped mirror (illumination light deflection element) 10 which is diagonally disposed in the horizontal direction at an elevation angle of 45°. Accordingly, the illumination light which are vertically incident on the collimator lens 8 from below are generated.

Since the collimator lens 8 and the mirror 10 has cutout portions 8a and 10a for accommodating the object optical system 5 extending in the horizontal direction, an illumination mask including a slit 11a having a shape in which a part of the annular shape for restricting the illumination light from the LED light source 6a in the circumferential direction is cut out may be used as the illumination mask 11, as shown in FIG. 12.

Figure 14:
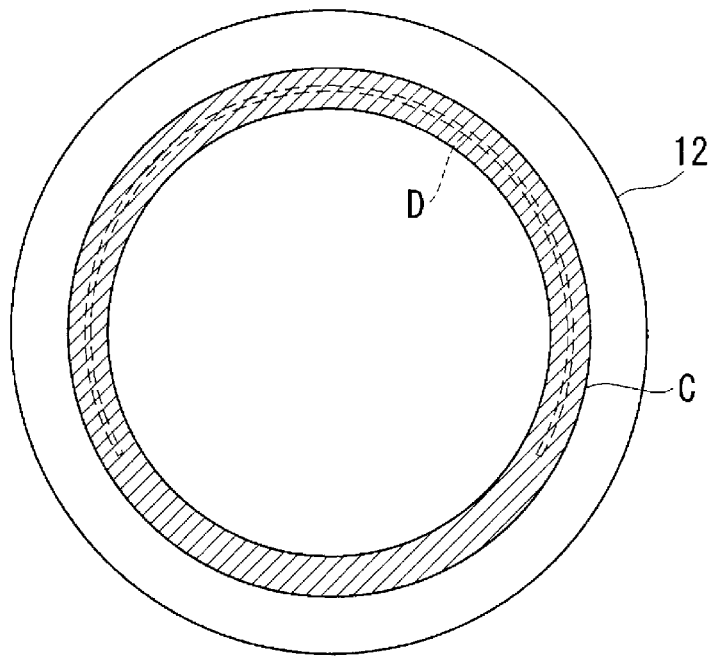
FIG. 14 is a diagram showing an example in which an emission region of the illumination mask provided in the observation device of FIG. 11 is projected.

As shown in FIG. 14, a pupil modulation element 12 having a annular region C of which transmittance is lower than that of another region is disposed on the pupil surface of the object optical system 5 in a position which is separated inwards in the radial direction from the edge of the pupil and includes an image D of the slit 11a projected on the pupil surface.

With such a configuration, after the illumination light transmitted through the slit 11a of the illumination mask 11 is deflected by the mirror 9, the illumination light is vertically deflected upwards by the mirror 10. The illumination light is converted into the approximately parallel light by the collimator lens 8, and diagonally tilts upwards. The illumination light is reflected from the top plate 2a of the container 2, and is incident on the object optical system 5.

Accordingly, the light ray height of the transmission light rays transmitted through the inside of the object optical system 5 becomes low, and the blocking of the light rays due to the flare stop 5g is decreased. Thus, it is possible to reduce brightness unevenness.

Figure 13:
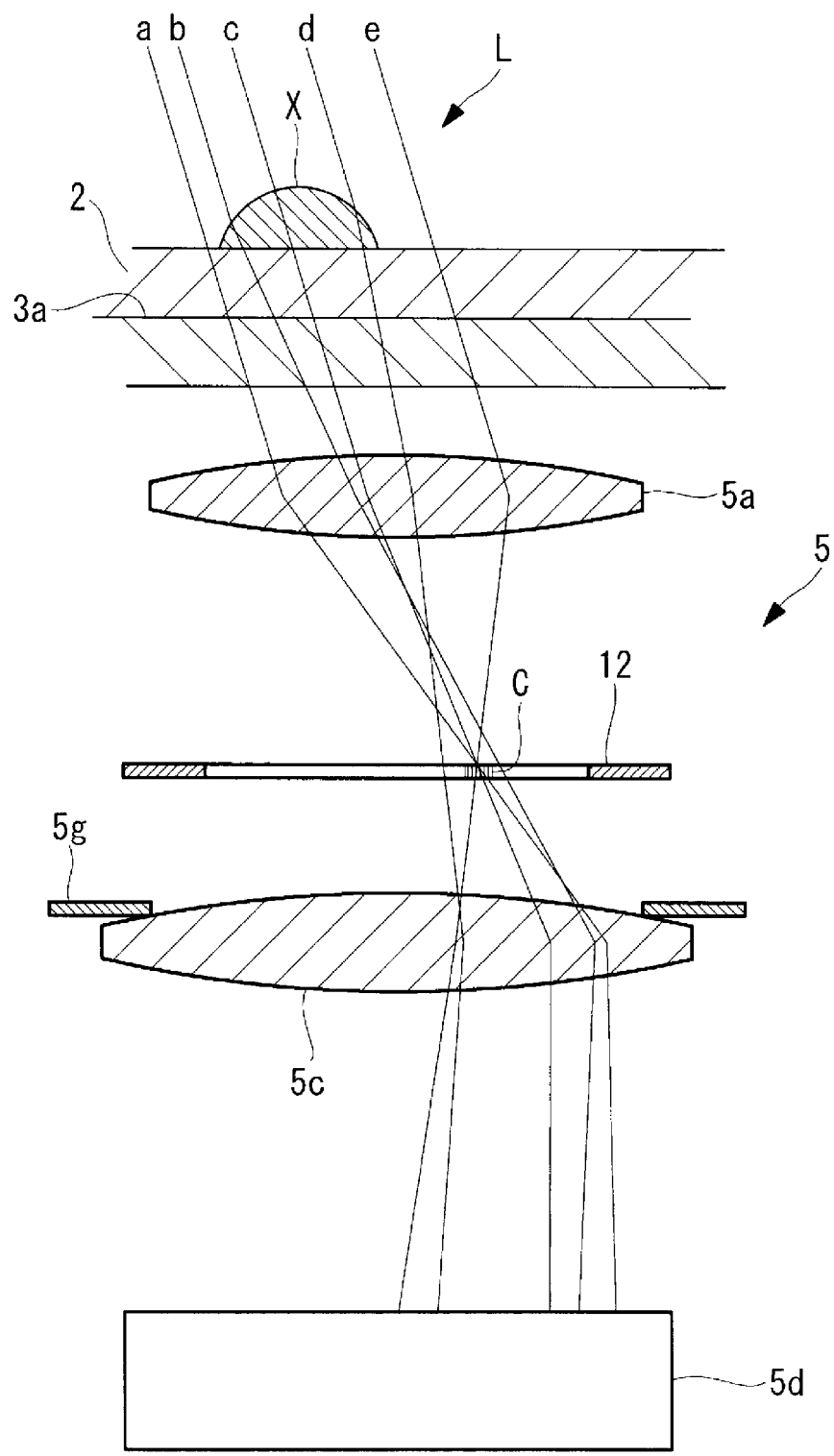
FIG. 13 is a longitudinal sectional view showing an object optical system for describing an operation of the observation device of FIG. 11.

In this case, as shown in FIG. 13, since light rays a and e which are not transmitted through the sample X and a light ray c which is incident on a front surface of the sample X at a right angle are transmitted through the low transmittance region C of the pupil modulation element 12, the light amount is attenuated, and a dark image is formed.

In FIG. 13, the transmission light b transmitted through the left side of the sample X is refracted by the sample X, and is transmitted through a position shifted from the low transmittance region C of the pupil modulation element 12. Accordingly, the light amount is not attenuated by the pupil modulation element 12, and a bright image is formed.

In FIG. 13, the transmission light d transmitted through the right side of the sample X is also refracted by the sample X, and is transmitted through a position shifted from the low transmittance region C of the pupil modulation element 12. Accordingly, the light amount is not attenuated by the pupil modulation element 12, and a bright image is formed.

Figure 15:
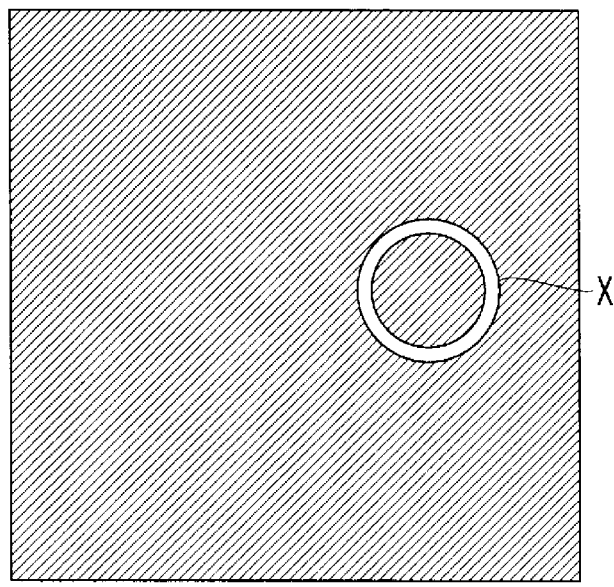
FIG. 15 is a diagram showing an example of an image of a sample acquired by the observation device of FIG. 11.

That is, in accordance with the observation device 1 according to the present embodiment, it is possible to acquire an image in which a peripheral portion of the sample X by which the illumination light rays are greatly refracted is bright and a position other than the peripheral portion is dark as shown in FIG. 15, and it is possible to observe the sample X at high contrast due to shades with no brightness unevenness as a whole. When the sample X is an achromatic cell, there is an advantage that it is possible to acquire an image of the sample X in which there is no brightness unevenness and shadows are isotropic.

As shown in FIG. 11, the LED light source may be arranged in an annular shape in close contact with each other in a circumferential direction so as to match the shape of the annular slit 11a, or may be arranged at intervals in the circumferential direction.

Although it has been described that the pupil modulation element 12 has the annular low transmittance region C, the low transmittance region C may further have a function of delaying a phase. In this case, the width of the annular low transmittance region C may be set to greater than that of FIG. 12 so as to transmit the transmission light rays refracted by the sample.

Figure 16:
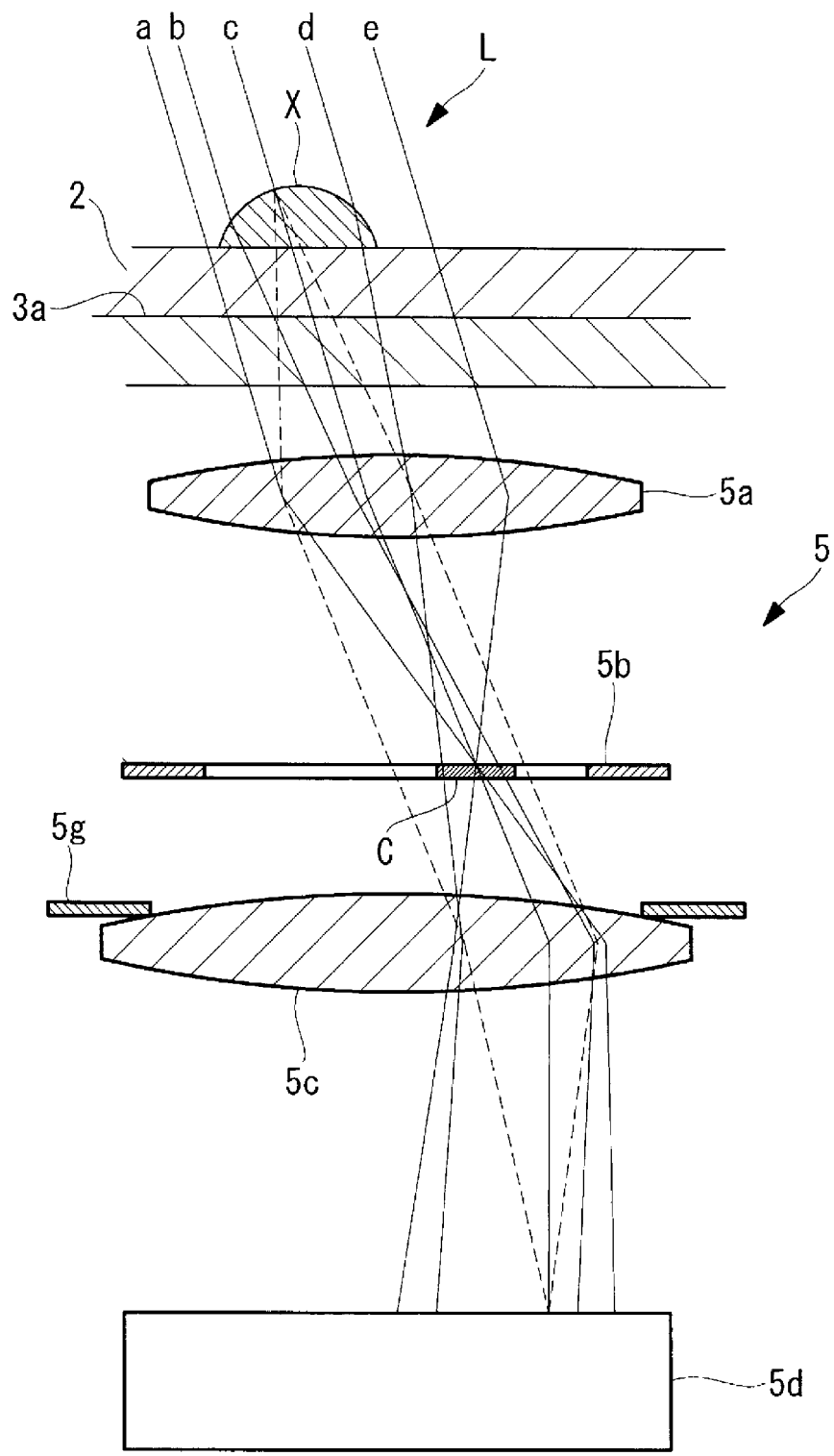
FIG. 16 is a longitudinal sectional view showing an object optical system for describing an operation of a modification example of the observation device of FIG. 11.

With such a configuration, as shown in FIG. 16, the light rays a and e which are not transmitted through the sample X are transmitted through the low transmittance region C of the pupil modulation element 12, and thus, these light rays reach the imaging element 5d after the light amount thereof is attenuated and the phase thereof is delayed. Accordingly, these light rays have moderate brightness.

The light rays b, c, and d transmitted through the sample X are divided into light rays (dashed lines) which are diffracted by a microstructure within the sample X and light rays (solid lines: zero-order diffracted light) which are not diffracted.

The zero-order diffracted light reaches the imaging element 5d after the zero-order diffracted light is attenuated by the low transmittance region C of the pupil modulation element 12 and the phase thereof is delayed.

The diffracted light is transmitted through a region having high transmittance other than the low transmittance region C of the pupil modulation element 12. Thus, the diffracted light reaches the imaging element 5d after the phase thereof is delayed by $\pi/4$ without being attenuated.

As a result, an image in which a portion other than the sample X has moderate brightness is acquired by the light rays which are not transmitted through the sample X. Meanwhile, the light ray transmitted through the sample X is branched through the diffraction. The zero-order diffracted light is transmitted through the low transmittance region C of the pupil modulation element 12, and another diffracted light is not transmitted through the low transmittance region C. As a result, these light rays interfere with each other, and are captured on the imaging element 5d.

Figure 17:
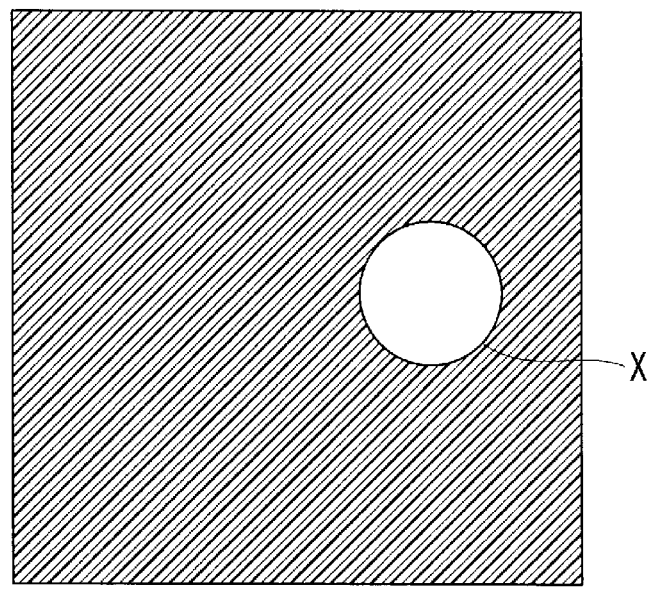
FIG. 17 is a diagram showing an example of an image of a sample acquired by the observation device of FIG. 16.
Figure 18:
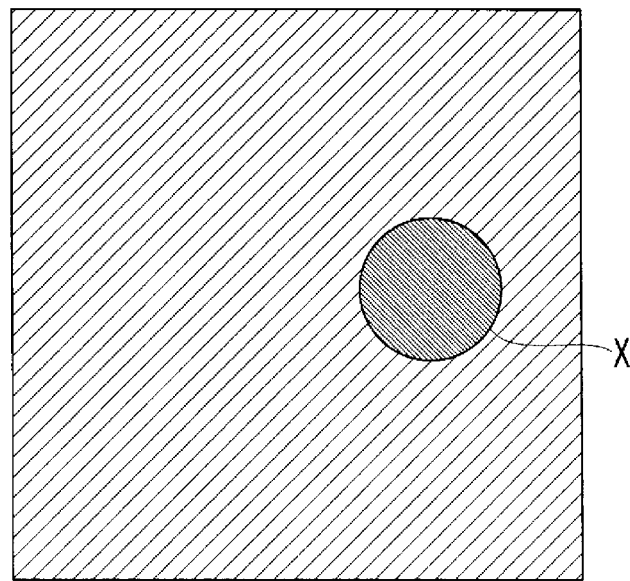
FIG. 18 is a diagram showing another example of the image of the sample acquired by the observation device of FIG. 16.

When a phase delay amount of the low transmittance region C is $\pi/4$, since the zero-order diffracted light and other diffracted light have the same phase delay amount of $\pi/4$, a phase difference is zero, and a bright image is formed due to the interference as shown in FIG. 17. Meanwhile, when the phase delay amount of the low transmittance region is $3\pi/4$, since a phase difference between the zero-order diffracted light and other diffracted light is $\pi$, a dark image is formed due to the interference as shown in FIG. 18.

Accordingly, there are advantages that it is possible to perform the observation using the image in which there is no brightness unevenness even on the sample X and the shadows are isotropic and it is possible to observe the microstructure within the sample X by using the diffracted light.

In the present embodiment, any of the plurality of LED light sources 6a arranged in the circumferential direction may be switched and turned on, and other LED light source may be turned off. With such a configuration, it is possible to change the position of the shadow formed on the image of the sample X depending on the turned-on LED light source 6a. Accordingly, there is an advantage that it is possible to select an easily viewable image according to the state of the sample X and it is possible to observe the selected image.

Figure 19:
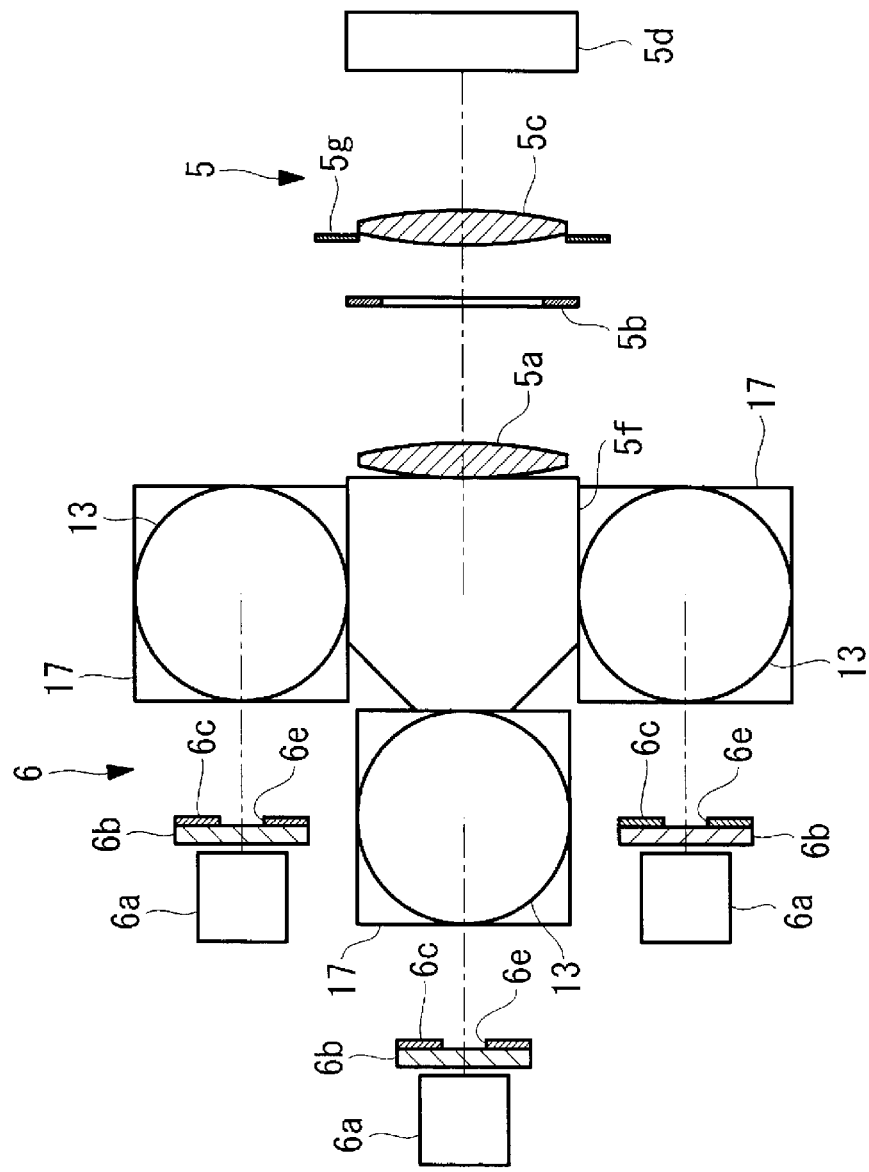
FIG. 19 is a plan view showing an illumination optical system and an object optical system of a modification example of the observation device of FIG. 1.

Although it has been descried in the present embodiment that the oblique illumination light which diagonally tilts upwards is generated by using the arc-shaped collimator lens 8 coaxial with the object optical system 5 and causing the illumination light to be incident on the outside of the axis, the illumination light may be similarly generated by disposing an individual collimator lens 13 in each LED light source 6a and diagonally tilting the optical axis of each collimator lens 13 as shown in FIG. 19.

In the example shown in FIG. 19, the illumination masks 6c are respectively provided in three LED light sources 6a that emit light rays in the horizontal direction, a mirror 17 that deflects the light ray from each LED light source 6a upwards is provided for each LED light source 6a, and the collimator lens 6d are disposed so as to tilt the optical axis such that the deflected light ray is converted into approximately parallel light which is diagonally headed upwards is provided for each LED light source 6a.

Figure 20:
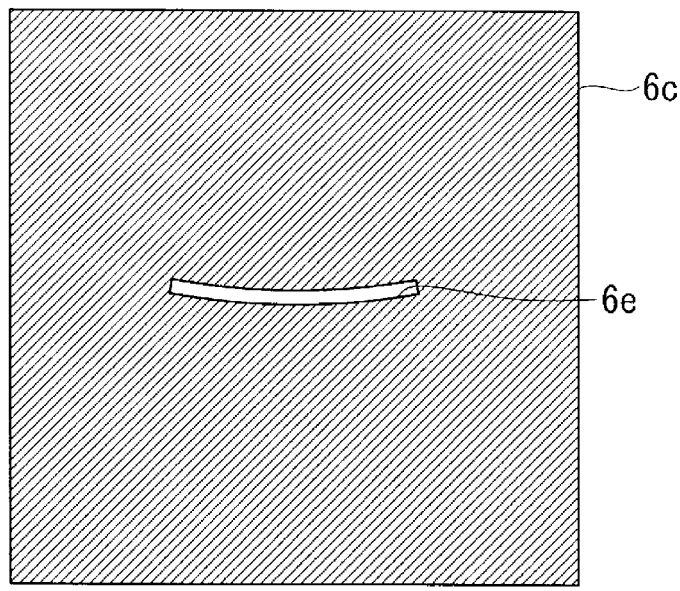
FIG. 20 is a front view showing an example of an illumination mask provided in the observation device of FIG. 19.
Figure 21:
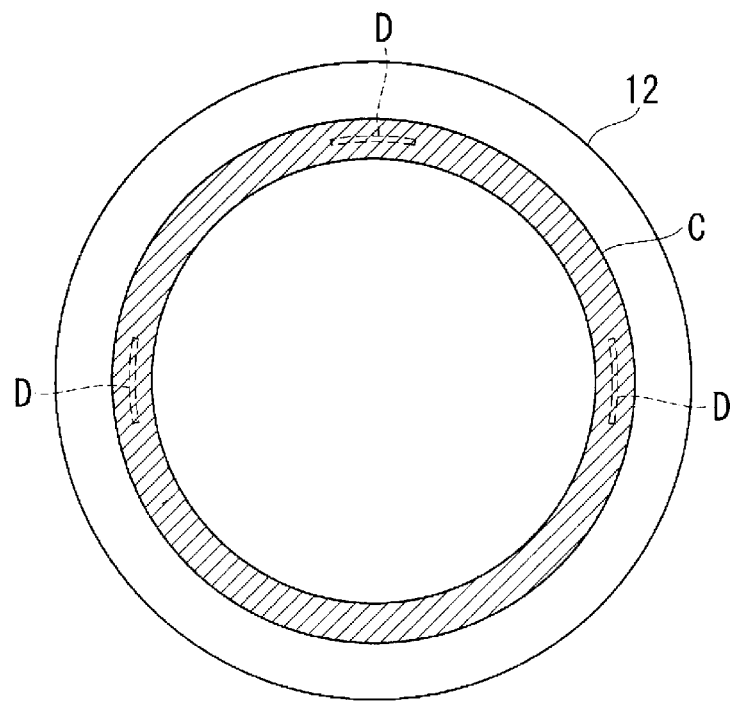
FIG. 21 is a diagram showing an example in which an emission region of the illumination mask of FIG. 20 is projected on a pupil modulation element provided in the observation device of FIG. 19.

As shown in FIG. 20, the shape of the opening 6e of each illumination mask 6c is formed in an arch slit shape so as to form a part of the same annular zone. Accordingly, the image D of the opening 6e of the illumination mask 6c projected on the pupil modulation element 12 is as shown in FIG. 21.

With such a configuration, it is possible to reduce the focal length of the collimator lens 13 without using the large collimator lens 8 and the mirrors 9 and 10. Accordingly, there is an advantage that it is possible to further reduce the size of the observation device 1. The positions of the mirror 17 and the collimator lens 13 may be changed.

Figure 22:
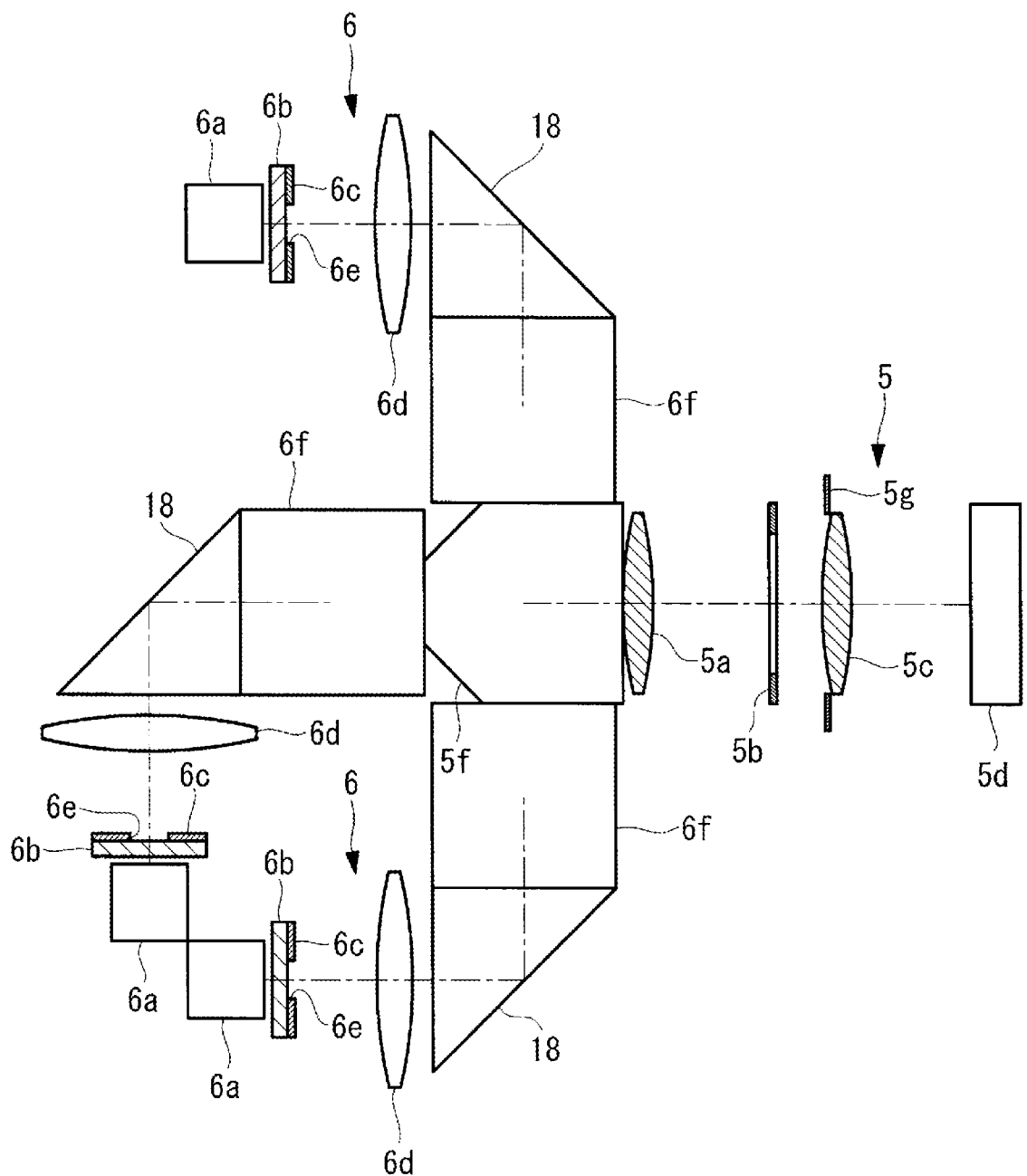
FIG. 22 is a plan view showing an illumination optical system and an object optical system of another modification example of the observation device of FIG. 1.

As shown in FIG. 22, the illumination light rendered to the approximately parallel light by the collimator lens 6d is bent in the horizontal direction by using a light deflection element 18 such as a prism. Thus, a space may be saved, and the device may cope with the containers 2 having various heights by increasing a luminous flux width.

Figure 23:
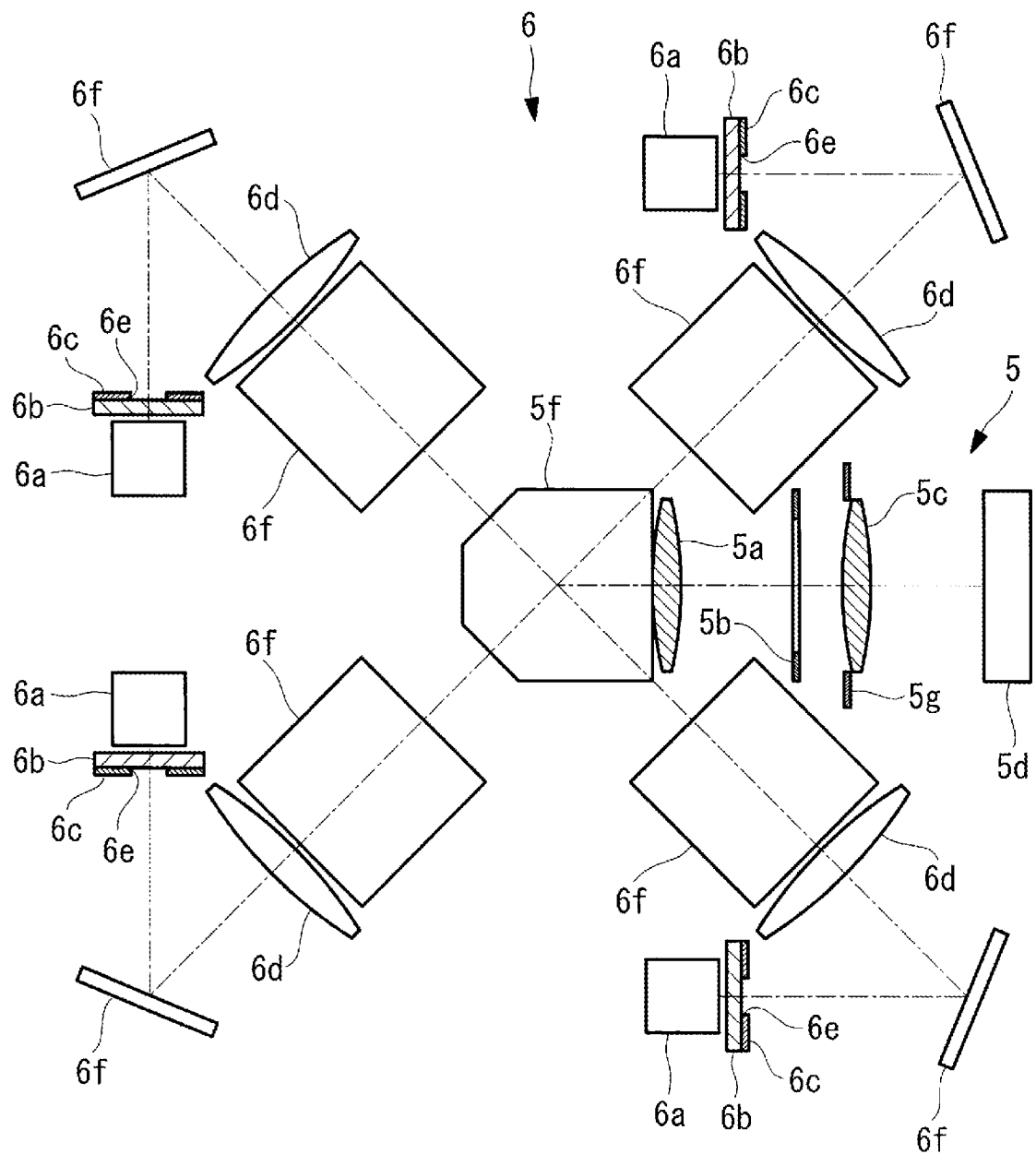
FIG. 23 is a plan view showing an illumination optical system and an object optical system of another modification example of the observation device of FIG. 1.

As shown in FIG. 23, the illumination optical systems 6 may be arranged in four diagonal directions, and the image of the sample X which is homogeneous irrespective of the direction may be acquired.

Figure 24:
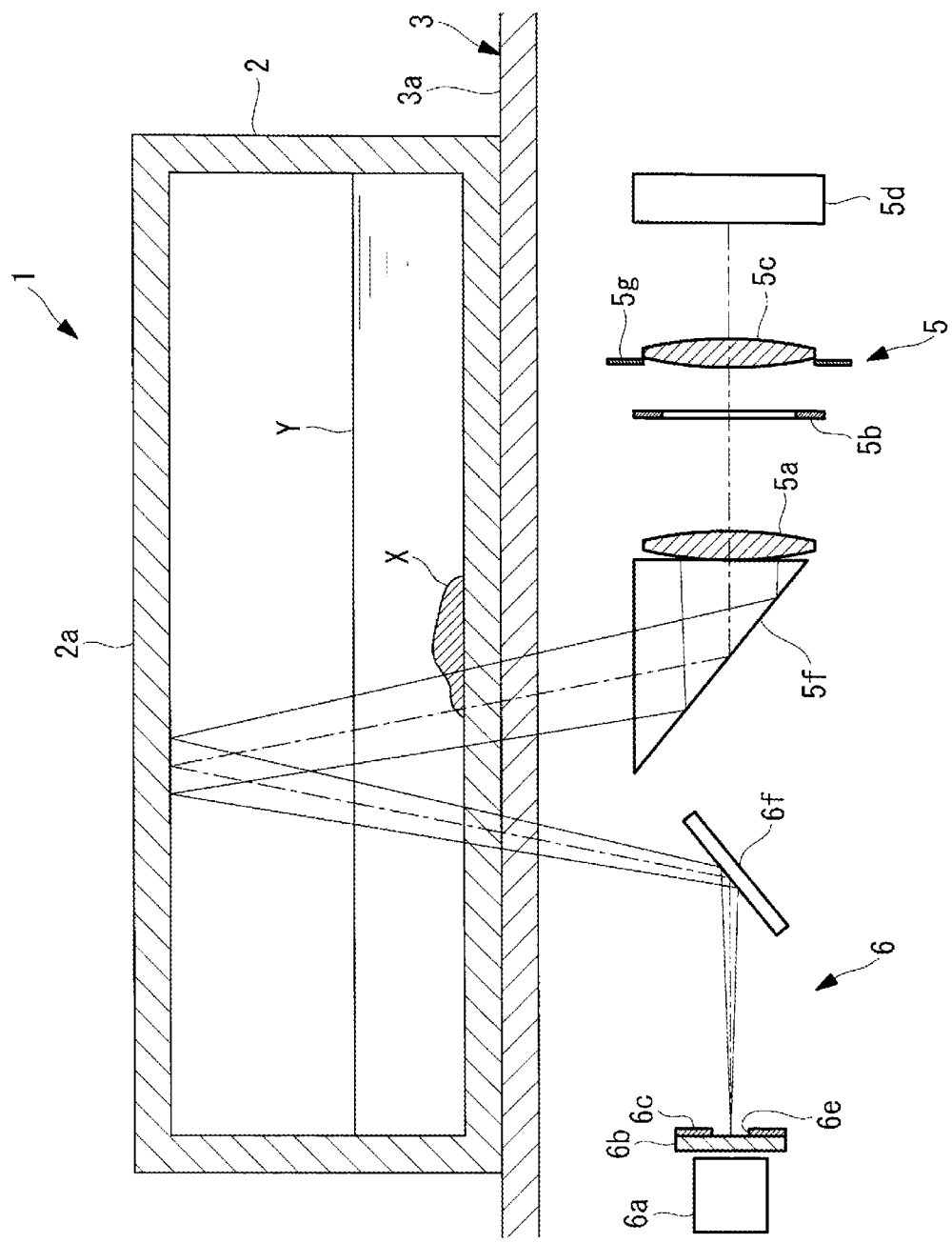
FIG. 24 is a longitudinal sectional view showing another modification example of the observation device of FIG. 1.

Although it has been described in the present embodiment that the collimator lenses 6d, 8, and 13 which render the light rays incident on the object optical system 5 to the approximately parallel light rays are used in order to project the opening 6e of the illumination mask 6c on the pupil modulation element 12, it is possible to regard the light rays incident on the object optical system 5 as the approximately parallel light rays when it is possible to sufficiently secure the distance between the LED light source 6a and the sample X. As shown in FIG. 24, the collimator lenses 6d, 8, and 13 may not be provided. Accordingly, it is possible to further reduce the size of the device. The optical path is bent by the mirror 6f, and thus, there is an advantage that it is possible to further increase a degree with which the transmission light rays incident on the object optical system 5 are parallel to each other by securing a sufficient distance between the LED light source 6a and the sample X while reducing the size of the device.

Figure 25:
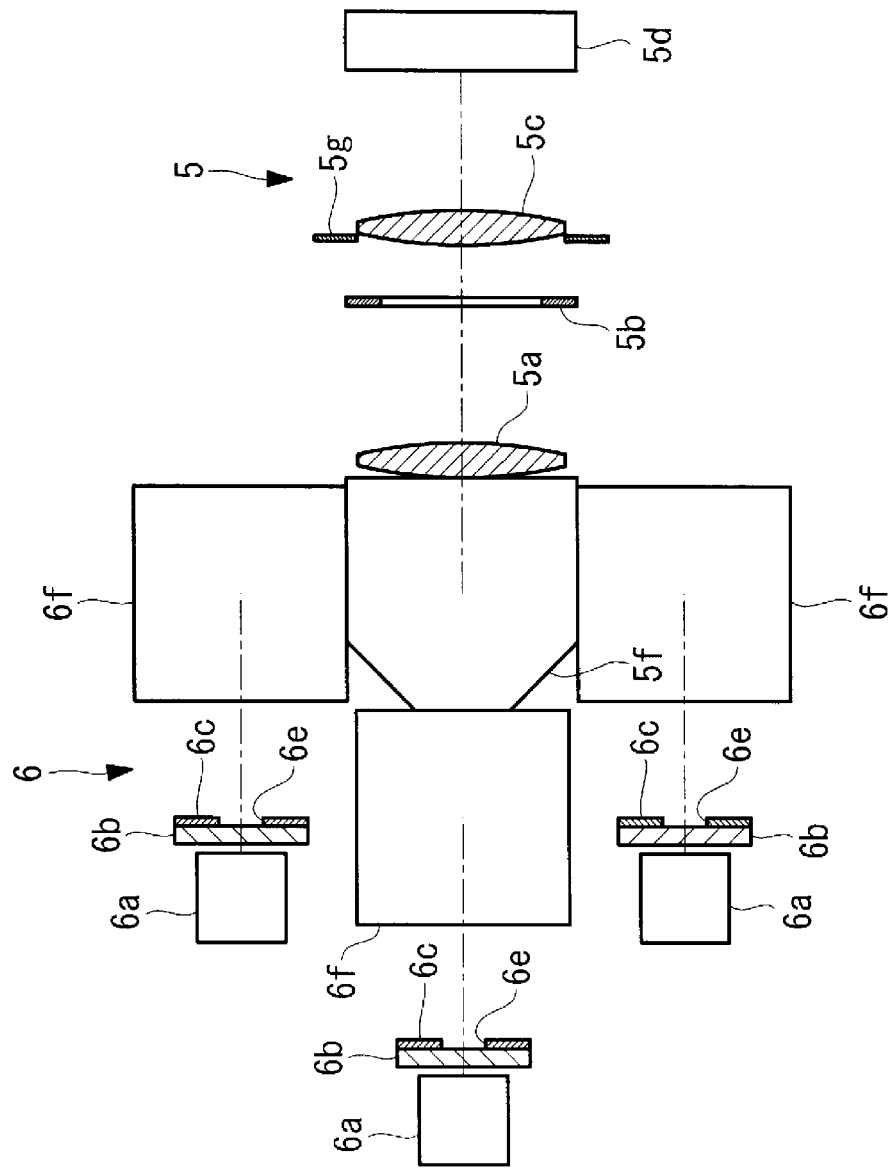
FIG. 25 is a plan view showing an object optical system and an illumination optical system including a plurality of LED light sources in the observation device of FIG. 24.

Such a configuration may be applied to a case where the plurality of LED light sources 6a is provided as shown in FIG. 25.

Although it has been described in the aforementioned embodiments that the LED light source 6a is used as the light source, the present embodiments are not limited thereto.

While there has been shown and described what is considered to be preferred embodiments, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

REFERENCE SIGNS LIST

1: observation device
5: object optical system
5f: prism (transmission light deflection element)
6: illumination optical system
6a: light source
6c, 11: illumination mask (mask)
6d, 8, 13: collimator lens (collimator optical system)
6e: opening (emission region)
6f, 9, 10, 17: mirror (illumination light deflection element)
8a: cutout portion
X: sample

The invention claimed is:
1. An observation device comprising:
a stage having a pedestal surface, a sample being located on a first side of the pedestal surface, the pedestal surface being transparent;
an illumination optical system located on a second side of the pedestal surface such that the illumination optical system emits illumination light toward the pedestal surface; and
an object optical system located on the second side of the pedestal surface, the object optical system capturing transmission light, the transmission light being generated from the illumination light which is emitted from the illumination optical system, is reflected off a reflection surface on the first side, and is transmitted through the sample, the sample being located between the pedestal surface and the reflecting surface
wherein a first light path in the illumination optical system is different from a second light path in the object optical system,
the illumination optical system includes a light source that emits the illumination light in a first direction, and an illumination deflector that deflects the illumination light from the first direction to a second direction,
a pre-reflected illumination angle between the pedestal surface and the first direction is smaller than a post-reflected illumination angle between the pedestal surface and the second direction,
the object optical system includes a transmission deflector that deflects the transmission light transmitted through the sample from a third direction to a fourth direction, and
a post-reflected transmission angle between the pedestal surface and the fourth direction is smaller than a pre-reflected transmission angle between the pedestal surface and the third direction.
2. The observation device according to claim 1, wherein the illumination optical system includes a collimator optical system that converts the illumination light into approximately parallel light.

3. The observation device according to claim 2, wherein the collimator optical system converts the illumination light deflected by the illumination deflector.

4. The observation device according to claim 2, wherein the illumination light deflector deflects the illumination light converted into the approximately parallel light by the collimator optical system.

5. The observation device according to claim 2, wherein the illumination light deflector surrounds an optical axis of the transmission light in the third direction.

6. The observation device according to claim 5, wherein the illumination light deflector is a collimator optical system.

7. The observation device according to claim 6, wherein the collimator optical system includes a cutout portion that accommodates the object optical system.

8. The observation device according to claim 5,
wherein the illumination light deflector includes a plurality of sub-deflectors,
the illumination light is irradiated toward the pedestal surface from any one of the plurality of sub-deflectors, and
the plurality of sub-deflectors are located around an optical axis of the transmission light in the third direction.

* * * * *